H. TEETER

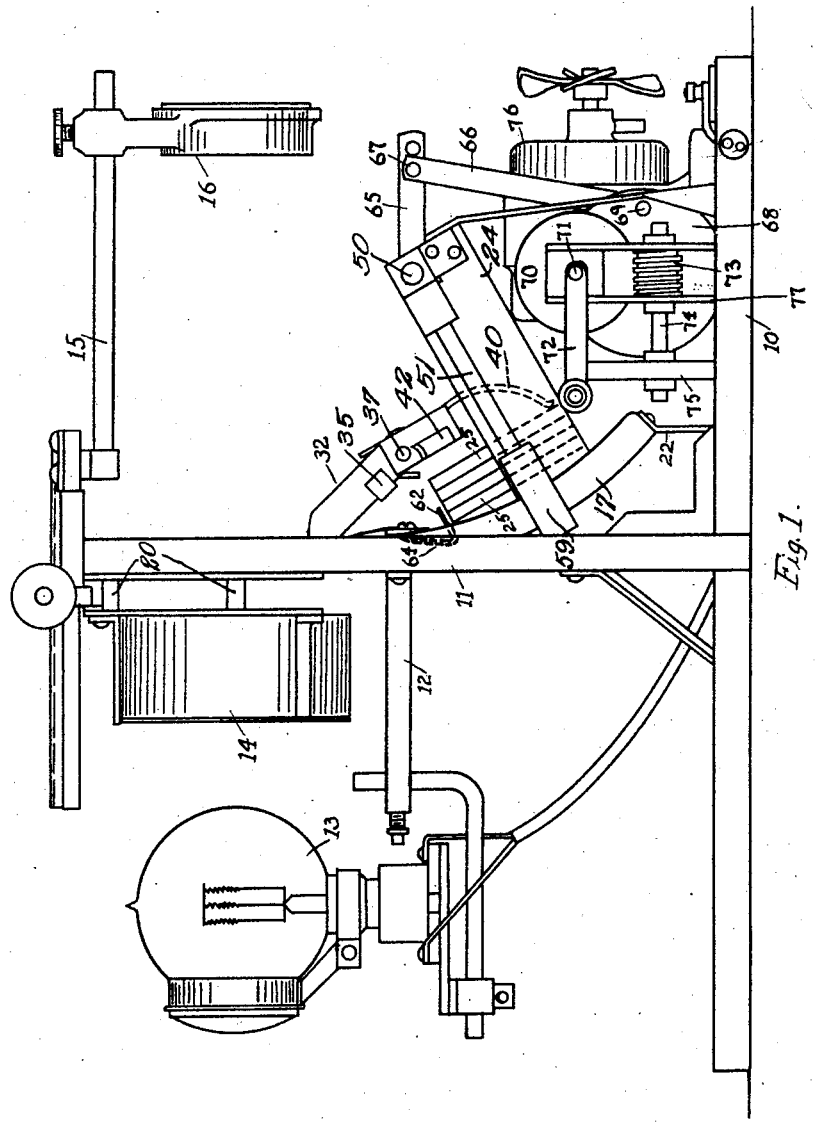

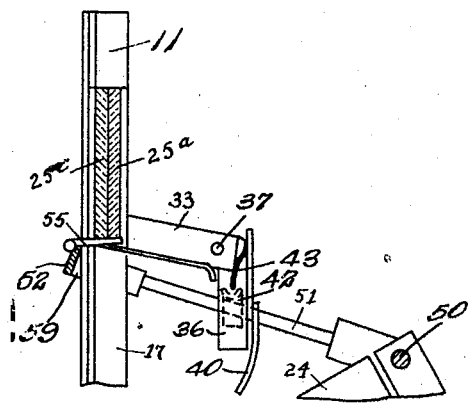
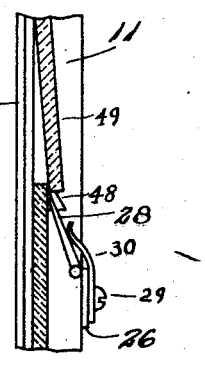
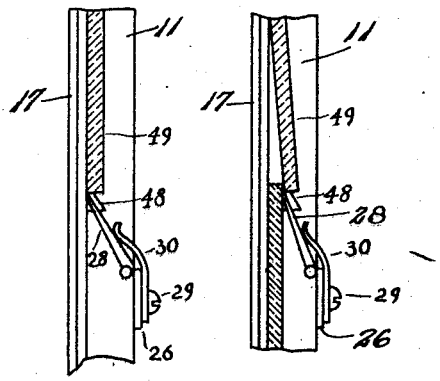
Fig.4.   Fig.5.   Fig.6.
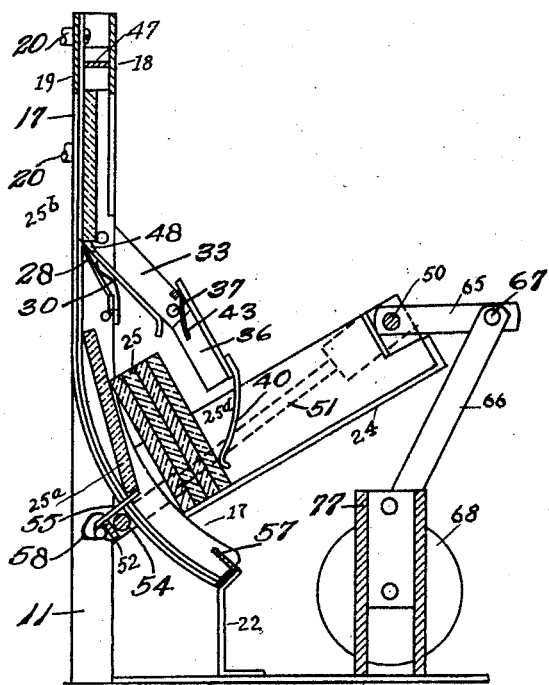
Fig.3.
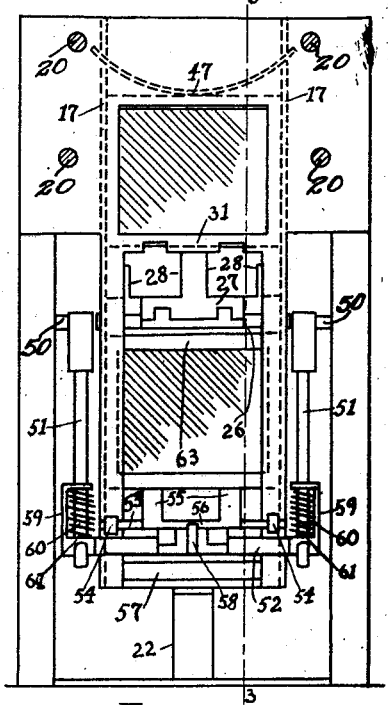
Fig.2.
INVENTOR
Harry Teeter
BY
L. L. Westfall
ATTORNEY June 23, 1925.  1,543,240

AUTOMATIC PICTURE DISPLAY APPARATUS

Filed June 4, 1923   3 Sheets-Sheet 3

INVENTOR
Harry Teeter
BY
L. L. Westfall
ATTORNEY

Patented June 23, 1925.

1,543,240

UNITED STATES PATENT OFFICE.

HARRY TEETER, OF SPOKANE, WASHINGTON, ASSIGNOR OF ONE-THIRD TO EDMUND D. BEEMAN AND ONE-THIRD TO GEORGE M. DENHAM, BOTH OF SPOKANE, WASHINGTON.

AUTOMATIC PICTURE-DISPLAY APPARATUS.

Application filed June 4, 1923. Serial No. 643,236.

*To all whom it may concern:*

Be it known that I, HARRY TEETER, a citizen of the United States of America, residing at 1808 Sprague Ave., Spokane, Spokane County, State of Washington, have invented new and useful Improvements in Automatic Picture-Display Apparatus, of which the following is a specification.

This invention pertains to improvements in automatic picture display apparatus adapted to successfully display each of a series of picture slides. In accordance with the usual practise in the art, the series of slides is located in a slide magazine, and each slide is carried successively by suitable mechanism by said magazine to a point of display. Unlike other devices of this character, the last displayed slide is held at a point of display until the oncoming slide is positioned at a point of display to the rear of the last displayed slide, before the latter starts to leave its position, when it immediately starts to move therefrom.

Objects of the invention are to provide an improved mechanism for elevating the slide and elevating the oncoming slide to the point of display, and holding the slide last displayed in position until the oncoming slide is positioned to the point of display, before discharging the last displayed slide from its position. As soon as the oncoming slide has taken its position at the point of display, the slide last displayed is returned to the magazine by means of a jointed carrier, whereby the fall of the slide is broken to prevent the same dropping too heavily into the magazine.

By the above construction there is always at least one slide at the point of display whereby no white light is ever shown upon the screen, the method of replacing slides merely producing a dissolving effect upon the screen.

A further improvement is, that the same is so constructed that it may be operated manually or by artificial power, the same being desirable in the use of the machine for different purposes, such as picture shows, illustrated lectures, advertising etc. By the construction of the apparatus as shown, the same is very compact, the point of display being but a short distance from the magazine, thereby avoiding a long fall of the discharged slides, the fall of the slide being further broken by the jointed carrier above mentioned.

A very convenient size for the machine completely housed by a metal covering and properly ventilated, stands 14 inches high and 22 inches long and 8 inches wide.

Other and further objects and purposes will be hereinafter disclosed. The invention will be hereinafter particularly described and illustrated in the accompanying drawings in which, Figure 1, is a side elevation of the complete devise with the covering removed.

Figure 2, is a rear elevation of the same, with the lens, lamp, bracket and supports removed.

Figure 3, is a sectional view taken on the line 3—3 of Figure 2.

Figure 4 is a broken away sectional view taken on the same line, showing the parts in position, whereby two slides are maintained at the point of display.

Figure 5, is a broken away sectional view, taken on the same line with the parts in position whereby one slide is at the point of display.

Figure 6, is a broken away sectional view taken on the same line, with the parts in position, whereby an oncoming slide is being positioned to the rear of a previously displayed slide.

Figure 7:
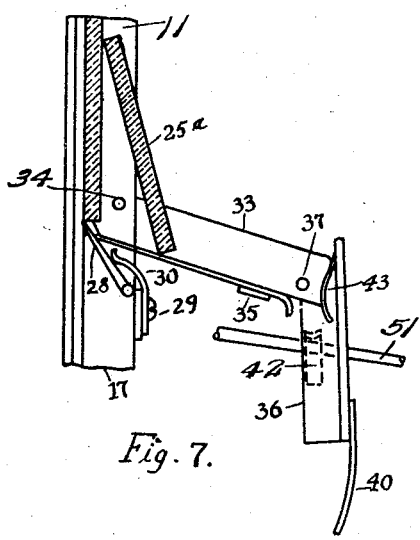
Figure 7, is a broken away sectional view, taken on the same line, with the parts in a position whereby the oncoming slide has been positioned at a display point, and a previously used slide is leaving the same.

In a detail description of the invention, the same is shown in connection with a stereopticon picture slide machine.

Attached to a horizontal frame support 10 (Fig. 1) is a vertical support 11, carrying a bracket 12, which supports a lamp 13. Attached to the top of the vertical support 11 is a condenser 14 and an arm 15, to which is attached a lens 16. Two L shaped curved supports 17, spaced apart by a member 57, attached to the top of the vertical support 11 between plates 18 and 19 (Fig. 3) by means of screws or bolts 20, extend downwardly from the plate 18 to a point near the base 21, and are braced therefrom by means of a support 22 connecting the two. Attached to the supports 17 near the bottom thereof, and extending upwardly and outwardly therefrom are L shaped members 24, the supports 17 and members 24 forming a magazine for the retention of a set of slides 25 (Fig. 3). Extending horizontally from one L shaped support 17 to the other, is a support 26 (Fig. 2), to which is hinged a member 27 having upwardly extending fingers 28. Secured to the support 26, as by a screw 29, is a spring 30, which bears against one of the fingers 28, forcing the same in contact with the portion 31 of the plate 19.

Figure 8:
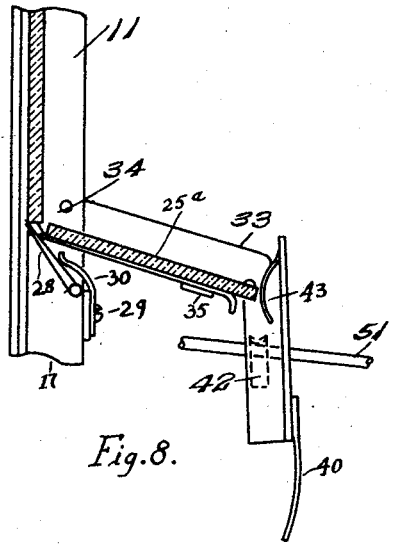
Figure 8, is a broken away sectional view taken on the same line, showing the parts in a position whereby the oncoming slide is at the point of display, and a previously used slide has dropped to an intermediate position on its way to the magazine.
Figure 9:
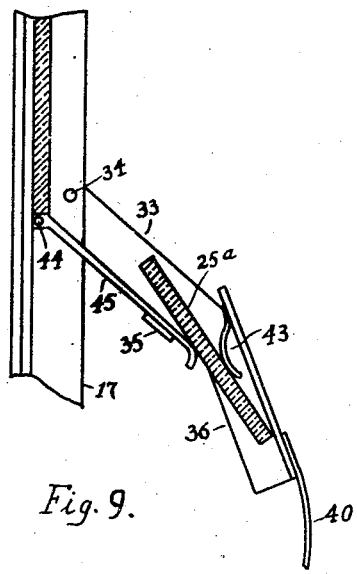
Figure 9, is a broken away sectional view taken on the same line, with the parts in a position whereby the previously used slide is leaving the intermediate position for its final drop into the magazine.
Figure 10:
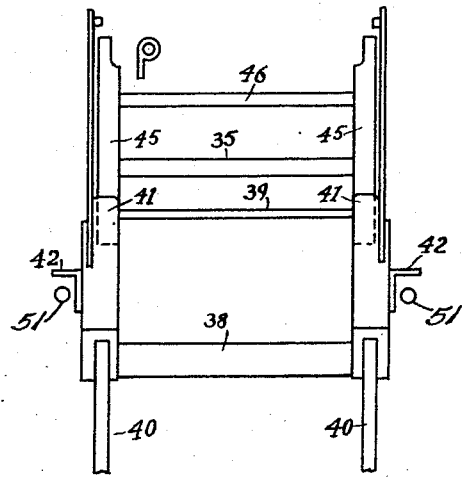
Figure 10, is a detailed view of the chute for conveying the slides from the point of display to the magazine.

A chute 32 (Fig. 1) is formed of two side members 33 pivoted to the members 17 at 34 (Fig. 9) connected by transverse members 35 and 39, and an extension formed of two members 36 pivoted to the outer ends of the members 33 at 37, and connected together by a transverse support 38 (Fig. 10). Attached to the members 36 are two downwardly extending curved fingers 40, the upper ends 41 of which are adapted to bear against the transverse support 39. Attached to and extending outwardly from each of the members 36 is a lug 42. On the inner side of the upper end of each of the fingers 40 is a spring 43, (Figs. 7, 8 and 9).

Pivoted to each of the members 17 at 44 (Fig. 9) is a member 45, the two being connected by a transverse member 46 (Fig. 10), the members 45 overlapping the transverse member 35 connecting the members 33. Extending transversely from one of the members 17, to the other near the top thereof and curved downwardly, is a spring 47. At the top of each of the two side fingers 28 is formed a lug 48, the same serving as supports for a slide 49 when in position between the condenser 14 and lens 16 (Fig. 5). A carriage for elevating and placing the slides 49 between the condenser 14 and lens 16, is formed by means of a rod 50 arranged transversely from the outer ends of the member 24, from one to the other and extending outwardly beyond the same and to the extensions of which are attached arms 51 (Fig. 2) extending rearwardly to a point beyond the members 17, where the same are connected by a transverse member 52, to which is attached a rod 53, carrying rollers 54, adapted to bear against the outer surface of the members 17. Hinged to the member 52 is a pair of fingers 55 joined together by a member 56 and against which bears a spring 58. Slidably adjusted to the arms 51 are brackets 59, and encircling the arms 51 within the brackets 59 are coil-springs 60 which bear against pins 61. A pair of lugs 62 (Fig. 1) reach from a transverse support 63 and extend over the top of the slides 25. The support 63 is suspended from the members 17 by means of springs 64. Rigidly secured to the center of the rod 50 is an arm 65, which is pivoted to an arm 66 at 67, the arm 66 being pivoted to the side of a gear 68 at 69. The gear 69 meshes with a gear 70 rigidly secured to a shaft 71, to which is secured a band crank 72. A worm gear 73 also meshes with the gear 70 and is rigidly secured to a shaft 74 to which is attached a band wheel 75, connected by a belt with an electric motor 76. The rotating mechanism described is supported by brackets 77 secured to the base 21 of the horizontal frame 10. The band rotating means and the electric rotating means are each shown and may be used independently of each other. However any suitable rotating means may be used.

In the practical operation of the machine, a set of slides 25 is placed in the magazine formed by the members 17 and 24, the rotating mechanism is started, whereby the arm 66 pulls downwardly the arm 65, thereby rotating the rod 50, which elevates the arms 51 and the rod 53, whereby the fingers 55 engage the lower end of the inner slide 25ª (Fig. 3) and elevates the same to the position 25ᵇ, when the same rests upon the lugs 48 (Fig. 5) this being the display position. The continued rotation reverses the action of the arms 51 and they come back to the position shown in Figure 3. In this process the rollers 54 engage and roll upon the outer surface of the members 17 and the springs 60 permit of the change in position of the rod 53 in order to adjust the same to the outer surface of the members 17. In the continued rotation the fingers 55 pick up and elevate the slide next in position and positions the same as shown at 25ᶜ (Fig. 4) forcing 25ª forward. The continued rotation carries again downwardly the rods 51, thereby removing the finger supports to the slide 25ª. The arms 51 in their upward movement have engaged the lugs 42 on the sides of the members 33, the chute is elevated to the position shown in Figure 7, the slide 25ª dropping onto the table 45 as shown in Figure 8, the same being held in that position by the position of the table 45 and the springs 43. The continued rotation again brings down the arms 51 and the chute drops to the position shown in Figure 9 and the slide 25ª guided by the springs 43 and fingers 40 drops to the position 25ᵈ (Fig. 3) in the magazine.

The curved supports 17 forming the magazine cause the slides 25 to set therein on a backward angle, whereby gravity causes the slides to stand without support.

What is claimed is:—

1. An automatic picture display apparatus, comprising a magazine with curved walls whereby the slides rest on a rearward angle, means for supporting the slides at a point of display, means for successively elevating the slides from the magazine to the point of display, means for elevating a slide to the point of display and to the rear of a slide already at the point of display, and means for discharging the slide first at the point of display after the succeeding slide has been placed at the point of display, and means for returning the same to the magazine by steps or interruptions including a table for receiving the same from the point of display and conveying them in the fall to the magazine.

2. An automatic picture display apparatus comprising a magazine with curved walls, whereby slides rest on an angle, means for supporting the slides at a point of display, means comprising rotatable arms with fingers attached to engage the slides for successively elevating the slides to the point of display and a jointed carrier as means for returning the slides to the magazine.

3. An automatic picture display apparatus, comprising a magazine for containing the slides, means for supporting a pair of slides at a point of display above the magazine, means for successively elevating the slides from the magazine to the point of display, and for discharging one slide therefrom after another has been placed to the rear thereof, and means comprising a movable pivoted table with guides attached for conveying the discharged slide therefrom back to the magazine.

4. An automatic picture display apparatus, comprising a magazine for containing the slides, means comprising rotatable arms with fingers attached to engage the slides for elevating the slides successively to a point of display, and means including a movable table with guides for returning the slides successively to the magazine by a jointed carrier.

In testimony whereof, I affix my signature.

HARRY TEETER